No. 803,978. PATENTED NOV. 7, 1905.
E. BLOMSETH.
KNIFE.
APPLICATION FILED NOV. 14, 1904.
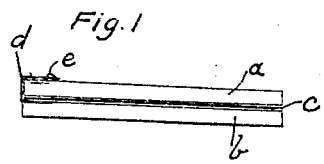
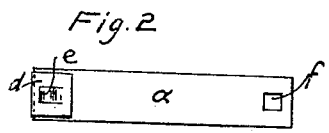
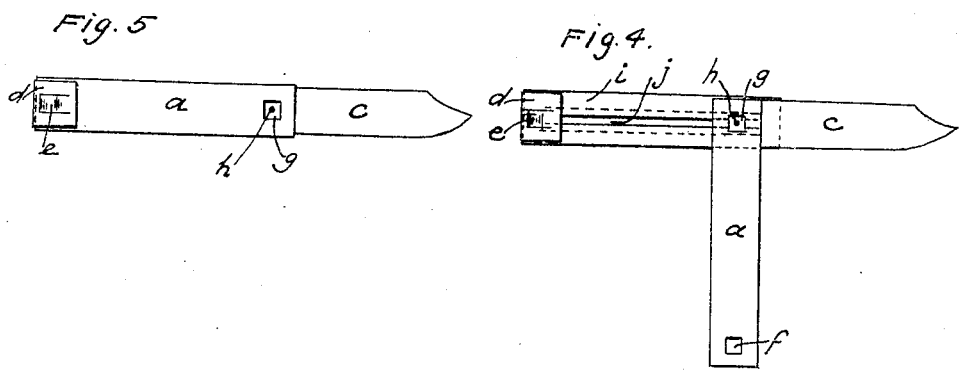
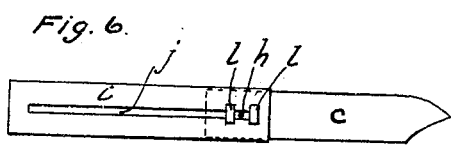
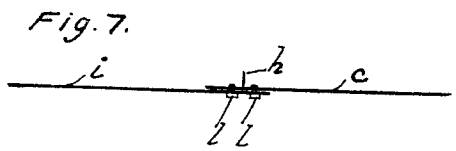
WITNESSES:
James G. Combs.
E C Byers
Ed Blomseth
INVENTOR
BY A A Anderson
ATTORNEY

UNITED STATES PATENT OFFICE.

ED BLOMSETH, OF SEATTLE, WASHINGTON.

KNIFE.

No. 803,978.     Specification of Letters Patent.     Patented Nov. 7, 1905.

Application filed November 14, 1904. Serial No. 232,712.

*To all whom it may concern:*

Be it known that I, ED BLOMSETH, a citizen of the United States, residing at Seattle, in the county of King and State of Washington, have invented certain new and useful Improvements in Knives, of which the following is a specification, reference being had therein to the accompanying drawings.

The invention consists in the peculiar construction of a pocket-knife comprising a casing in which a blade slidingly engages, a pin secured to the blade extending through a slot in the casing and connected to a plate on the outside which when turned at an angle to or left in line with the casing may be employed as a handle to slip the blade in or out and when turned parallel therewith forms a complementary portion to the handle when the blade is opened or closed. In the one-half of the case in which is the slot through which the pin slides is the blade, which is always kept parallel to this half by means of two pivots placed a little distance apart, passing through the blade and through the slot in the handle. The construction is designed to make a knife that is easily opened and safe to use when the blade is pulled out and that the blade will not close on the hand when in use. That by reason of these rivets and a spring the blade will be held in a secure position when in use and the handle when closed.

The invention further consists in the peculiar construction, arrangement, and combination of the various parts, as more fully hereinafter described.

In the drawings, Figure 1 is a perspective view of my improved knife, showing it closed, the blade thereby being concealed. Fig. 2 is a side view showing the side of the handle or casing which is turned and moved to open the knife and showing the spring to hold both parts of the handle in place when the knife is either open or shut. Fig. 3 is a view of the knife, showing the slot in the handle and the spring in it and the movable part drawn out at full length in line with the slot, the blade being concealed behind it. Fig. 4 shows the knife open with the blade extended at full length, but with the movable or actuating part of the handle turned at right angle with the remainder of the knife. Fig. 5 shows the knife completely open and ready for use. Fig. 6 shows the knife open, but with the movable or actuating side removed, showing the slot through which the pivots move that hold the blade and showing the pivots. Fig. 7 shows the lining to one side of the handle and the blade drawn out at full length in opposite directions from each other and shows the pivot on which the blade turns and also shows the pivots that hold the blade from closing and in place.

$a$ is the movable or actuating side of the handle of the knife, having at one end the nick $f$, and $b$ is the other side of the handle of the knife.

C is the blade, which is of suitable length to be inclosed entirely within the handle.

$d$ is a piece of metal so arranged as to admit of the end of the movable or actuating part of the handle of the knife and containing the spring $e$, which catches and holds firmly in place either end of the movable part of the handle.

$f$ is a nick in the movable part of the handle into which the spring $e$ fits.

$g$ is a metal plate, and $h$ is a pivot passing through it and upon which the blade is fastened.

$i$ is the metal lining on the inside of the handle through which is cut the slot $j$, allowing the pivots that hold the blade to slide freely.

$l\ l$ are the pivots that hold the blade in direct line with the slot $j$ and prevent the blade from closing on the hand when the knife is entirely opened.

The parts being thus constructed their operation is as follows: In the closed position of the knife the spring $e$ fits into the nick and holds the knife shut. To open it, the operator either slides out at full length or turns the movable part of the handle around partly and slides the blade out at full length and then turns the movable part of the handle half-way around so that the end that rests in the spring when the knife is closed is at the base of the blade and the other end rests in the spring at the end of the handle most distant from the blade when the knife is open.

What I claim as my invention is—

In a knife, the combination with a stationary member, a movable member pivoted thereto, a metal plate or lining formed with a central slot and mounted between said members, the knife-blade provided with pins or pivots at its base portion, said pivots adapted to slide in the slot of the lining, and a spring-clip mounted on one end of the stationary member and adapted to engage the movable member to secure it in place.

In testimony whereof I have signed this specification in the presence of two subscribing witnesses.

ED BLOMSETH.

Witnesses:
A. A. ANDERSON,
JAMES G. COMBS.